United States Patent [19]
Azima

[11] Patent Number: 6,026,834
[45] Date of Patent: Feb. 22, 2000

[54] FLUID MASS FLOW CONTROLLER DEVICE AND METHOD

[76] Inventor: Faramarz Azima, 376 9th St., Montara, Calif. 94037

[21] Appl. No.: 08/953,449

[22] Filed: Oct. 17, 1997

[51] Int. Cl.[7] ..................................................... G05D 7/06
[52] U.S. Cl. .............................................. 137/1; 137/270
[58] Field of Search ................... 137/269, 270, 137/271, 884, 486, 487.5, 1

[56] References Cited

U.S. PATENT DOCUMENTS

| | | |
|---|---|---|
| 4,440,021 | 4/1984 | Abouchar et al. . |
| 4,569,504 | 2/1986 | Doyle . |
| 4,667,153 | 5/1987 | Doyle . |
| 4,684,886 | 8/1987 | Doyle . |
| 4,686,856 | 8/1987 | Vavra et al. . |
| 4,687,020 | 8/1987 | Doyle . |
| 4,858,643 | 8/1989 | Vavra et al. . |
| 4,928,048 | 5/1990 | Doyle . |
| 5,080,131 | 1/1992 | Ono et al. . |
| 5,141,021 | 8/1992 | Shimomura et al. . |
| 5,159,951 | 11/1992 | Ono et al. . |
| 5,447,173 | 9/1995 | Kazama et al. . |
| 5,769,110 | 6/1998 | Ohmi et al. ................................ 137/269 |
| 5,816,285 | 10/1998 | Ohmi et al. ....................... 137/487.5 X |

*Primary Examiner*—Kevin Lee
*Attorney, Agent, or Firm*—Townsend and Townsend and Crew LLP

[57] ABSTRACT

The present invention provides a technique for controlling fluid flows through a mass flow controller ("MFC") device 10 in different directions. The technique includes a device 10 having a novel control valve assembly design for selectively providing an upstream or downstream configuration without exchanging parts or requiring additional parts.

19 Claims, 11 Drawing Sheets

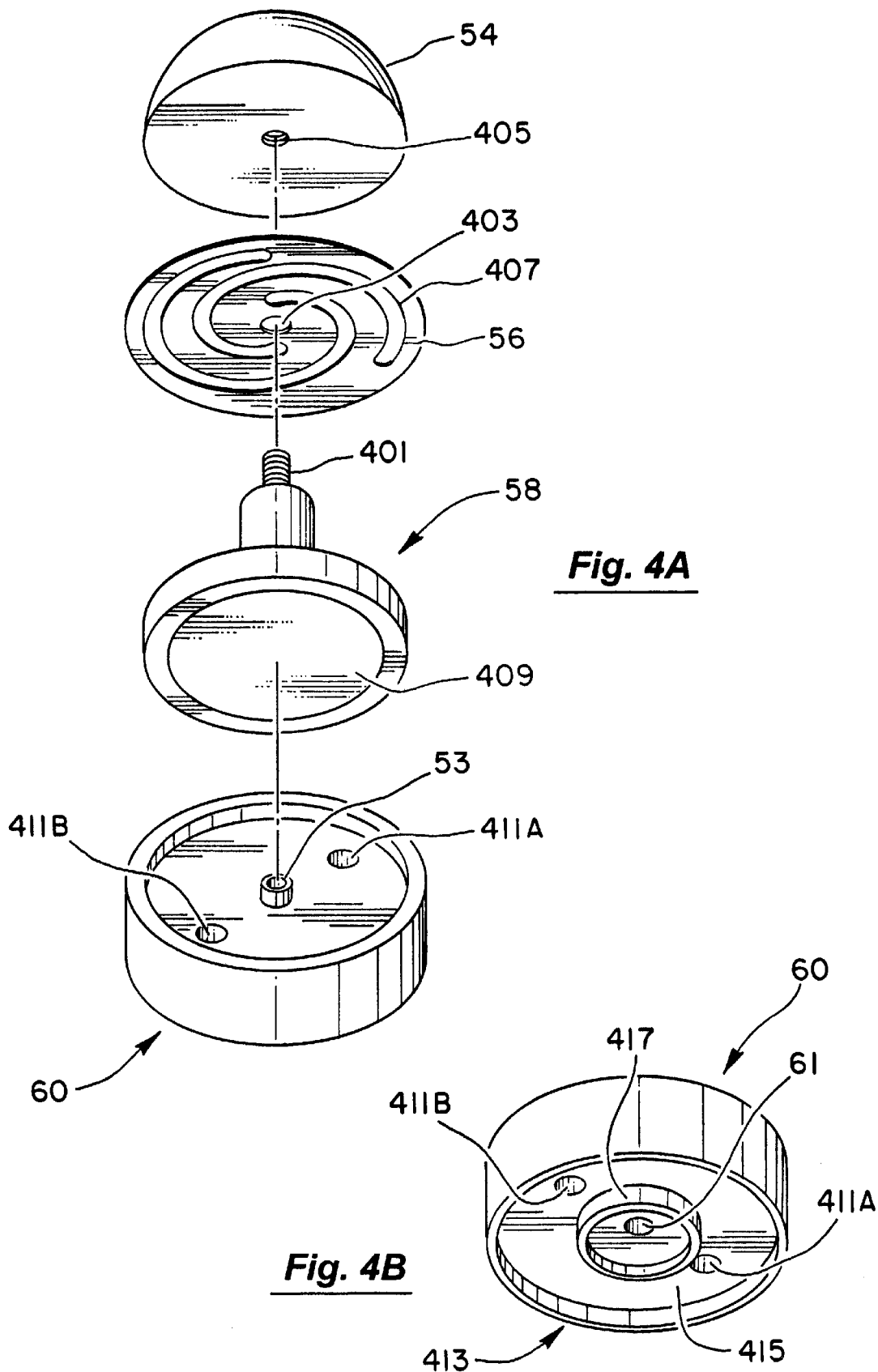

Fig. 5E
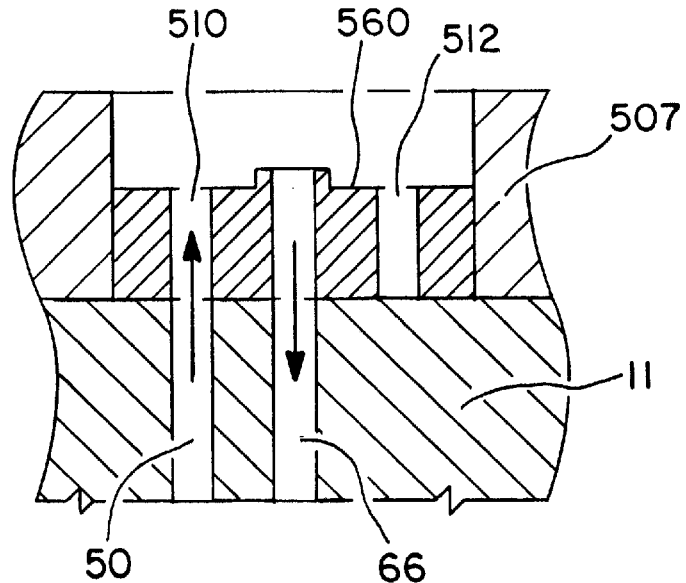
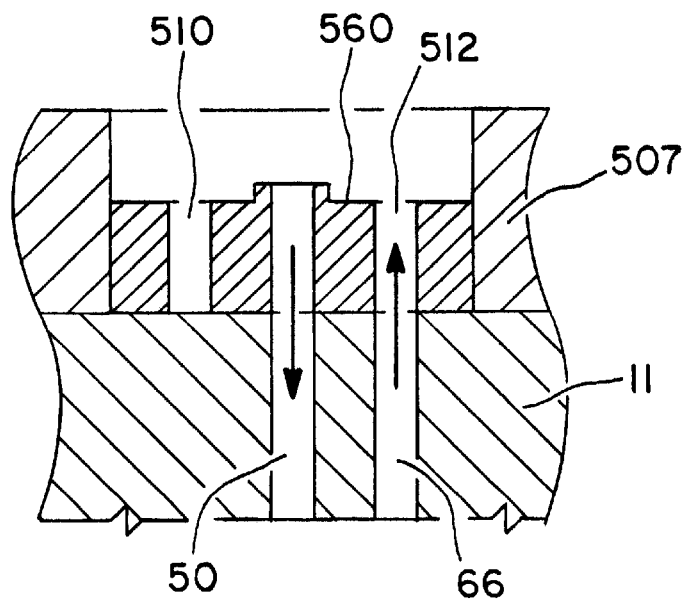
Fig. 5F

FLUID MASS FLOW CONTROLLER DEVICE AND METHOD

BACKGROUND OF THE INVENTION

The present invention relates to a mass flow controller, commonly termed MFC. More particularly, the present invention provides a novel technique, including a device and a method, for maintaining a fluid flow rate of fluids used in, for example, semiconductor processing or the like. Merely by way of example, the present invention is illustrated using a device and methods related to integrated circuit processing. But it will be recognized that the present invention also can be applied to the manufacture of products, such as flat panel displays, hard disk drives, and others.

In the manufacture of semiconductor integrated circuits, process complexity and wafer size tends to increase. For instance, wafer size has increased from one inch to over six inches during the past thirty years. Larger-sized wafers, such as twelve-inch wafers and larger, are being proposed. As wafer size and complexity of processing increase, the gases used for the manufacture of the integrated circuits also become more important. In particular, control of a selected flow rate range for a process step (e.g., plasma etching ("PE") and chemical vapor deposition ("CVD")) becomes important. Accordingly, mass flow controllers have been used to selectively control fluid flow rates of selected process steps.

Numerous mass flow controllers are on the market today. MFCs typically include four functional blocks, illustrated in FIG. 1. A bypass 3 conveys most of the gas flow (indicated by arrows) through the MFC and across the inlet and output of a sensor assembly 5. The sensor assembly includes a relatively small tube that draws a small amount of gas from the bypass and measures the gas flow by heating the gas and detecting how much heat the gas flow carries away. The flow through the sensor tube is calibrated to the flow in the bypass for particular types of gases, as different gases have different heat capacities. The sensor assembly 5 is wired to an electronic control circuit 7, which adjusts a control valve 9 to provide the desired total flow (through the bypass) according to the measured flow through the sensor assembly.

Manufacturers of mass flow controllers include, among others, Unit Instruments, Inc. ("Unit"), Brooks Instruments ("Brooks"), and Tylan General ("Tylan"). These manufacturers generally have a broad range of products to cover a variety of flow ranges and flow directions, which are used in the manufacture of integrated circuit devices. For instance, Unit has at least ten different products for the purpose of covering a variety of situations. Tylan has at least seven different products. As for Brooks, it has about eight products or more for covering different fluid flow situations.

A limitation with these conventional mass flow controllers is their sheer number, where each controller can often be used for only a limited fluid flow range and direction of flow. The sheer number of these mass flow controllers often translates into large numbers of different controller units being used and stored for replacement in the manufacturing line or semiconductor fabrication plant, commonly termed wafer fab. Accordingly, it is often quite expensive and time consuming to keep available all necessary spare parts to replace faulty or broken mass flow controllers, or to convert an MFC from one application to another.

There are also applications where it may be desirable to place the sensor unit upstream from the control valve, and others where it is desirable to place the sensor unit downstream from the control valve. For example, if the bypass would be evacuated when the control valve is closed, it may be desirable to place the bypass upstream from the control valve to avoid an unstable condition as the bypass charges with gas upon start-up. "Upstream" and "downstream" are relative terms, arbitrarily chosen for convenience in describing different configurations of MFCs, based upon a direction of flow. Conventional MFCs may not be reversible, or may require a large inventory of parts to convert from an upstream configuration to a downstream configuration.

From the above, it is seen that a mass flow controller which may easily be converted from an upstream configuration to a downstream configuration would be desirable.

SUMMARY OF THE INVENTION

According to the present invention, a technique, including a device and method, for maintaining a fluid flow rate of a fluid used in, for example, semiconductor processing or the like is provided. In an embodiment, the present invention provides an MFC capable of being converted from a configuration wherein the sensor assembly is upstream from the control valve, to a configuration wherein the sensor assembly is downstream from the control valve, without needing to exchange or add any parts to the MFC. This allows a single MFC to be used in a variety of applications, thus minimizing parts inventories and allowing a single MFC to be applied in a greater number of situations.

In a specific embodiment, the present invention provides a fluid mass flow control device having a novel orifice body and/or valve block design to allow for either an upstream or downstream configuration. The device includes an orifice body and an asymmetrical valve block. The MFC may be converted from an upstream configuration to a downstream configuration by rotating the valve block 180 degrees with respect to the main body of the MFC, thus transposing the inlet and outlet of the orifice body. In another embodiment, the valve block is not asymmetrical and is laterally moved (slid), rather than rotated, with respect to the main body.

In an alternative specific embodiment, the present invention provides an orifice body with an offset outlet. That is, the outlet is radially offset from the orifice so that the orifice body converts an upstream valve configuration to a downstream configuration by rotating the orifice body in the valve block.

In yet another embodiment, the present invention provides a method of fabricating a fluid flow controller using a novel valve plunger design. The method includes a step of providing a magnetic hemispherical valve plunger, which is disposed within a hemispherical plunger cavity. An electromagnet actuates the valve plunger to open the control valve. The hemispherical design of the valve plunger reduces corrosion of the plunger, thus reducing contamination of the fluid through the valve and increasing plunger lifetime, and also reduces the plunger sticking in the plunger cavity, as is common with conventional cylindrical plunger designs.

Numerous benefits are achieved by way of the present invention over pre-existing techniques. In particular, the present invention can provide a single mass flow control unit for upstream or downstream flow configurations. This reduces the sheer number of MFC's required and also simplifies the number of spare parts required for maintaining a system having several MFCs. Accordingly, the present invention achieves these benefits and others, which will be described in further detail throughout the specification.

The present invention achieves these benefits and others in the context of known process technology. However, a further understanding of the nature and advantages of the

BRIEF DESCRIPTION OF THE DRAWINGS

FIG. 4A is a simplified exploded isometric view of a portion of a valve assembly according to the present invention;

FIG. 4B is a simplified isometric view of the bottom of an orifice body according to an embodiment of the present invention;

FIG. 5E is a simplified cross section of a portion of an MFC showing an orifice body without an inlet ring configured for an upstream application according to an embodiment of the present invention;

FIG. 5F is a simplified cross section of the portion of an MFC of FIG. 5E re-configured for a downstream application;

DESCRIPTION OF SPECIFIC EMBODIMENTS

The present invention provides a technique including a device and method for maintaining a fluid flow rate of fluids used in, for example, semiconductor processing or the like. In an embodiment, the present invention provides an MFC capable of being operated in reversible flow configurations, including in an upstream or downstream configuration, which are used in a variety of semiconductor processing operations. The reversible flow configurations are achieved by way of a novel valve body and/or orifice body design.

1. Mass Flow Controller

Figure 2:
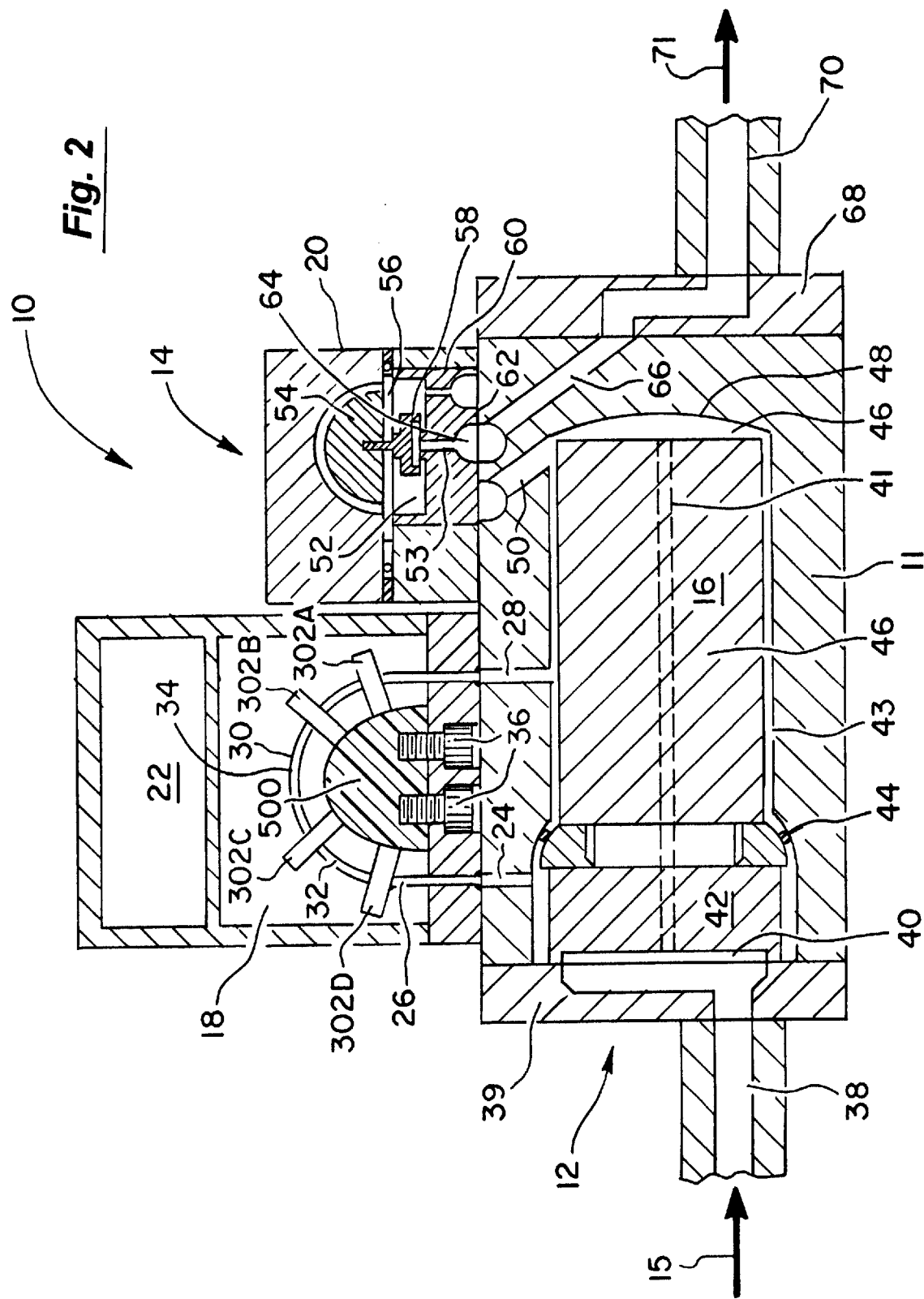
FIG. 2 is a simplified cross section view diagram of an MFC according to the present invention.

Mass flow controllers, commonly termed MFCs, are used whenever accurate measurement and control of a gas(s) is desired. An MFC includes a mass flow meter, a proportional controller, and other elements. FIG. 2, for example, illustrates a simplified side-view diagram of a mass or fluid flow controller 10 according to the present invention. This diagram is merely an illustration and should not limit the scope of the claims herein. One of ordinary skill in the art would recognize other variations, alternatives, and modifications.

The MFC 10 generally includes a mass flow meter 12, a controller 14, and other elements. The mass flow meter 12 divides fluid flow 15 between a flow restriction element or by-pass element 16, where most of the flow passes, and sensor tube 26, where mass flow is measured. Sensor tube 26 is located in a sensor unit 18. Controller 14 includes, among other elements, a variable displacement solenoid valve, which may be a magnetic proportional control valve assembly 20. The controller 14 drives the valve to a position so that measured flow equals a desired flow 71 set-point for a particular process. The following description is for an "upstream" configuration, that is, a configuration where the sensor assembly 22 is placed upstream from the control valve assembly 20 relative to the flow of fluid through the MFC. It is understood that the MFC can be used in a downstream configuration, in which case the following description would be amended as appropriate. In upstream operation, for example, fluid 15 flows into the MFC through inlet 38. Inlet 38 couples to end-cap 39, which seals one end of housing or main body 11. Fluid flows through an orifice in end-cap 39 into chamber 40, which couples to by-pass element 16. By-pass element 16 includes one or more laminar flow tube(s) 41, which allows fluid to flow in a laminar manner through the by-pass element 16.

By-pass element 16 is generally removable from the main chamber 43 of the main body 11. In particular, by-pass element 16 is insertable into main chamber 43 when end-cap 39 is not present. By-pass element 16 is replaceable or detachable from main chamber 43 in the main body 11 by removing end-cap 39, which holds and seals the by-pass element 16 into place of the main body 11. By-pass element also includes region 42 for holding or clustering one or more of the laminar flow tubes into the by-pass element. Region 44 of the by-pass element includes an annular periphery (i.e., rounded corners) to seal the by-pass element to the main chamber 43 of main body 11. Fluid traverses through one or more of the laminar flow tubes and exits into chamber 46, which is coupled to valve 20 through valve-by-pass conduit 50. Chamber 40 may have an annular or concave structure 48 (e.g., rounded) to facilitate fluid flow from one or more laminar flow tubes to the valve-by-pass conduit 50.

By-pass element 16 also has a relatively long elongated structure for providing a wide range of fluid flow ranges. By-pass element 16 makes effective use of the main body by extending into a region underlying the sensor unit 20. In some embodiments, by-pass element takes up a length greater than about 70% or 80% or 90% or 95% of the length of the main body 11. More preferably, by-pass element takes up a length greater than about 90% of the length of the main body. In most embodiments, main body includes a length of about five or four or three and one-half, or preferably three inches and less, but can be greater. This length generally allows the main body or the MFC to be placed in process lines between a source gas and a processing chamber. Additional details regarding the by-pass element are described below.

Sensor unit 22 is coupled to the main body 11 by way of sensor tube ports 24 and 28. Sensor unit 22 is also coupled mechanically to main body 11 using, for example, fasteners 36, e.g., screws, or bolts. A portion of fluid flows from region 42 of the by-pass element into sensor tube port 24. Sensor tube port 24 is an annular region which provides fluid into sensor tube 26. The sensor unit also includes temperature sensing elements 32 and 34 for monitoring a difference in temperature between sensor tube ports 24 and 28. Additionally, the sensor unit includes heater element 30, which is often a resistive coil, for adding heat to the fluid through the periphery of the sensor tube 26. Fluid leaves sensor unit 18 through sensor tube port 28 and enters by-pass element 16.

Fluid leaves by-pass element through valve-by-pass conduit 50 and enters valve assembly 20, which selectively adjusts fluid flow to a desired set-point. Fluid leaves valve-by-pass conduit 50 and enters valve chamber 52 in the valve assembly 20. From the valve chamber 52, fluid traverses under valve seat 58, through orifice 53, and out an outlet 61 in orifice body 60 to an inlet/outlet conduit 66. A combination of at least a valve plunger 54 and a valve spring 56 actuates valve element 64 to selectively control fluid flow through the valve. Upon traversing through orifice body 60, fluid enters and traverses through inlet/outlet conduit 66. Inlet/outlet conduit 66 allows fluid to enter into a chamber in end-plate 68, which is connected or coupled to outlet 70. Fluid 71 enters or exits from inlet/outlet 70 to, for example, a processing chamber or the like. The processing chamber can be, among others, a chamber for etching, a deposition chamber, a sputtering chamber, and an implantation chamber.

In theory, for example, mass flow meter 12 uses thermal properties of a gas to measure mass flow rate. In particular, mass flow meter generally relies upon a principle that each molecule in a gas has a specific ability to pick up heat. The principle relates to a property of the gas commonly termed the "specific heat" ($C_p$), which is the specific heat at constant pressure. The specific heat relates at least to mass and physical structure of the gas and can be determined experimentally or looked up in a reference book such as, for example, the CRC Handbook of Chemistry and Physics, but is not limited to this reference book. The specific heat is often known for a variety of gases and is, for the most part, insensitive to changes in pressure and/or temperature.

Figure 3:
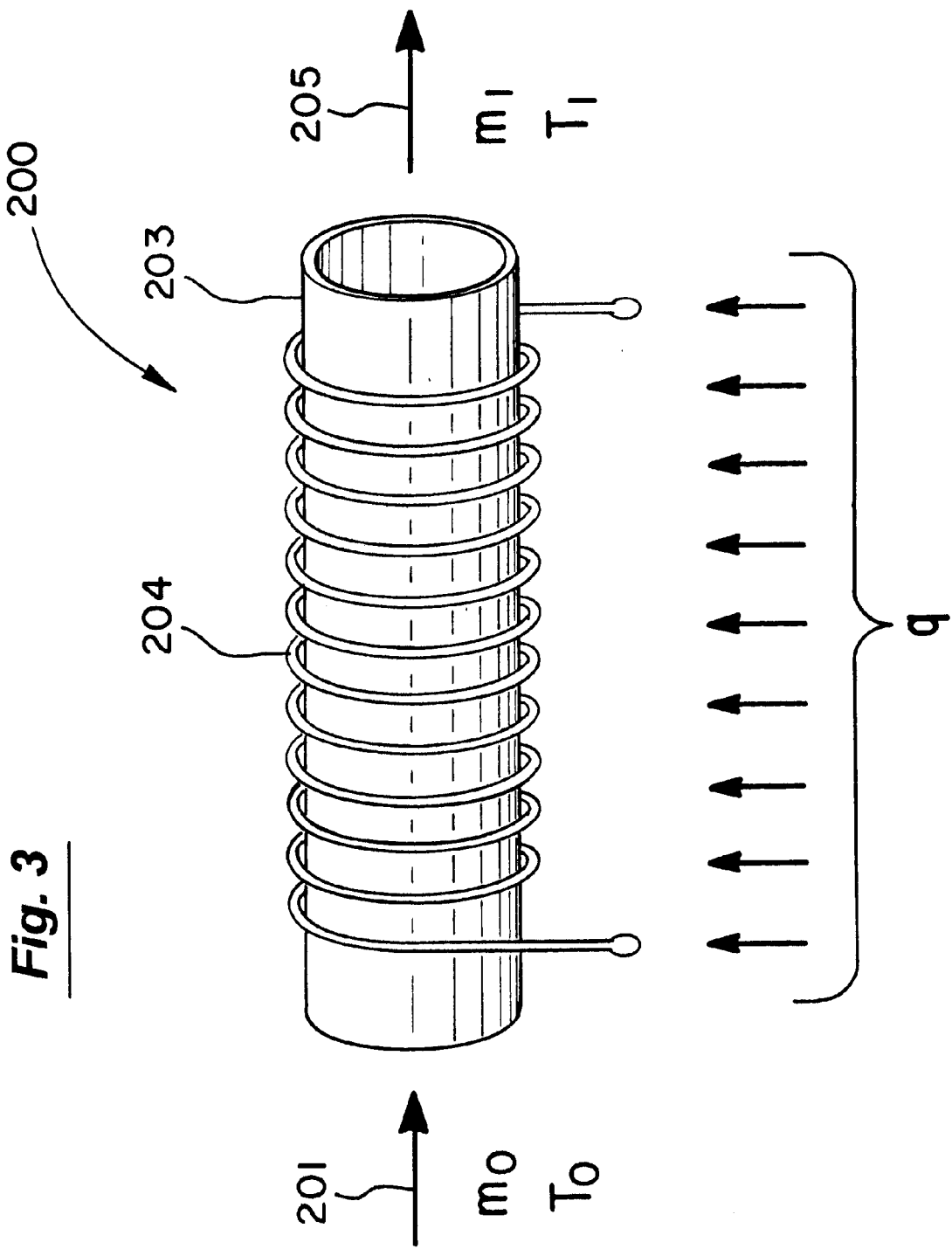
FIG. 3 is a simplified diagram illustrating operation of an MFC according to the present invention.

Mass flow meter 12 operates by adding a selected amount of heat to a gas and monitoring a change in temperature of the gas. By way of the change in temperature and heat, a mass flow rate of the gas can be determined. Referring to FIG. 3, for example, an illustration of mass flow controller operation 200 is depicted. A gas 201 enters sensor tube 203 at an initial temperature ("$T_0$") and mass flow rate ("$m_0$"). Heat ("q") is applied to the tube to increase temperature of the gas in the tube 203. In particular, resistive heat can be applied to tube 203 using resistive heating element 204. Outgoing gas 205 leaves tube at a higher temperature ("$T_1$") and mass flow rate ("$m_1$"). Conservation of mass suggests that incoming mass flow rate $m_0$ is equal to outgoing mass flow rate $m_1$. A relationship between heat, heat capacity, mass flow rate, and change in temperature is governed by the following equation:

$$q = mC_p dt$$

where q is heat applied to the gas in the tube;
m is mass flow rate;
$C_p$ is heat capacity at constant temperature; and
dt is differential change in gas temperature.

Referring to the equation, heat (q) applied to the tube 203 can be measured by way of measuring an electric current at a specific voltage applied to the tube. As noted above, the heat capacity ($C_p$) can be found in a reference book such as, for example, the CRC Handbook of Chemistry and Physics, but is not limited to this reference book. Differential temperature (e.g., $T_0$, $T_1$) also can be measured by way of resistivities. Accordingly, mass flow rate (m) in the sensor tube is readily determined by way of the equation.

Total or net mass flow rate for the mass flow controller can be determined by a flow relation between the sensor tube and the by-pass element. As noted, most of the flow shunts through by-pass element and a portion of the flow splits off into the sensor tube in the sensor. A percentage of fluid flow through the sensor tube is relatively constant in relation to the fluid flow through the by-pass element for a selected fluid flow operating range. By way of measuring the fluid flow passing through the sensor tube, total flow can be determined, as long as the percentage of flow between the tubes remains substantially constant. Preferably, fluid flow through the sensor tube has a substantially laminar profile to maintain accurate fluid flow measurement and preserve the relatively constant flow relation between the by-pass element and the sensor tube.

Figure 1:
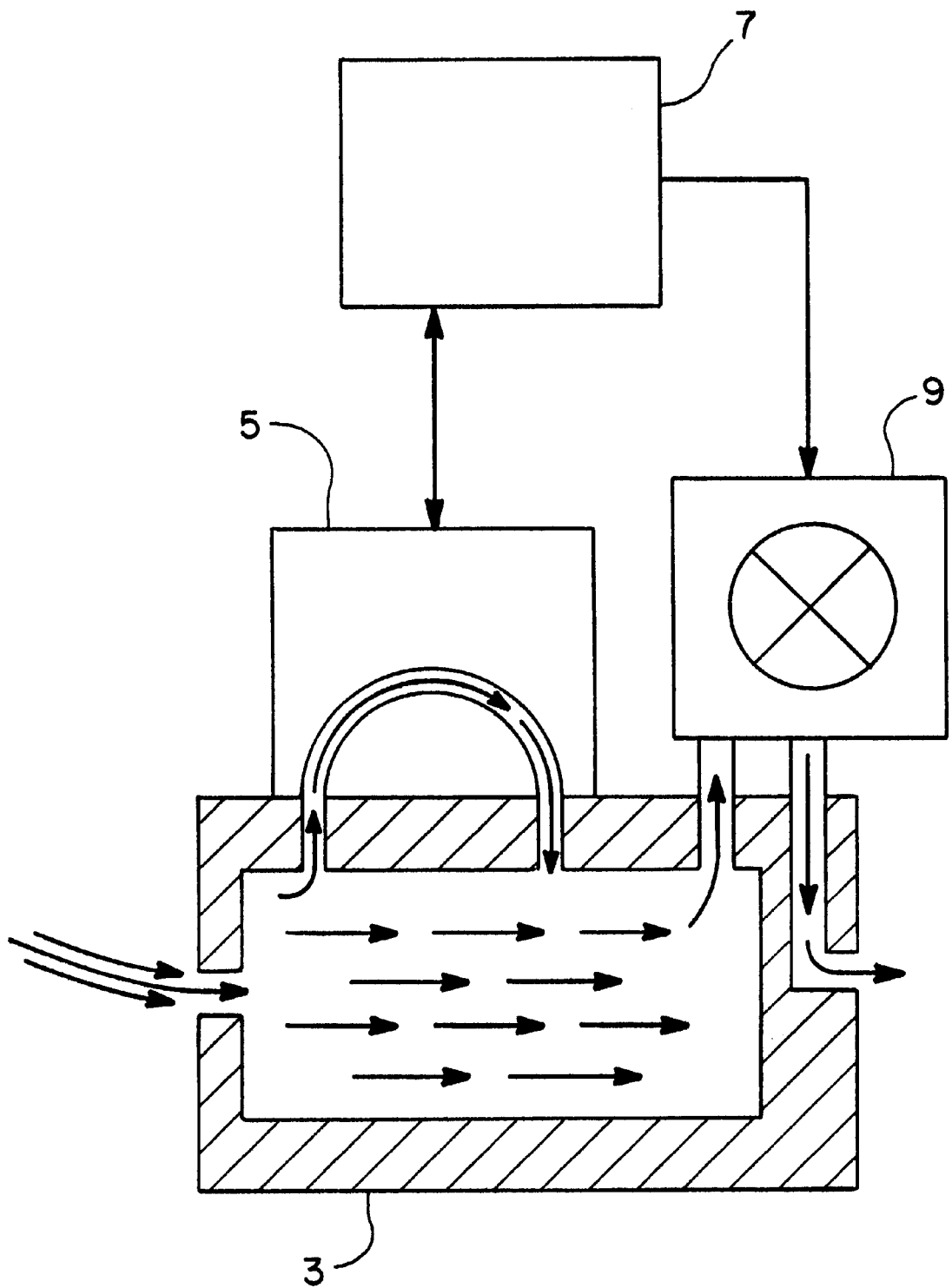
FIG. 1 is a simplified block diagram of a conventional MFC.

Referring again to FIG. 1, the sensor assembly 22 is coupled to a control unit 14 with harness wires 301. The control unit provides an electric current to the electromagnet 303, which is coupled to the valve assembly 20. The control unit provides up to about 30 volts to the electromagnet through magnet harness wires 305. The voltage supplied to the electromagnet, which corresponds to a current through the electromagnet coil 307, is proportional to the difference between the output of the sensor assembly 22 and a set-point. The set-point is established by calibrating the MFC for a particular flow of a particular type of gas. The difference between the output of the sensor assembly and the set-point is an indication of the difference between the actual flow through the MFC and the desired flow. A greater difference between the actual and desired flow results in more current being supplied to the electromagnet 303 from the control unit 14.

The valve plunger 54 is magnetic, that is, the material of the valve plunger is attracted by a magnetic field. An example of a suitable valve plunger material is 440 stainless steel, which has the beneficial attribute of being relatively resistant to corrosion in most fluids flowing through the MFC. The valve plunger is shaped as a half sphere, or hemisphere, which also reduces corrosion because corrosion often occurs as the corners or edges of conventional plungers, such as cylindrical plungers. The hemispherical shape has only a circumferential edge, which may be radiused or chamfered to further reduce corrosion in this area. The valve plunger may also be finished with a particular surface finish, such as by bead blasting or polishing the surface, or the surface may be coated, such as with an polymer film, to further reduce corrosion and allow the use of other types of magnetic materials. The hemispherical design is also less likely to stick or jam as a result of particulates or residue, such as from silane, depositing on the plunger or on the surfaces of the plunger pocket. In a conventional cylindrical plunger, particulates may lodge between the plunger and its sleeve. In the present design, the hemispherical plunger moves toward and away from, rather than along, its mating surface. As the electromagnet 303 is energized by the control unit 14, the magnetic valve plunger 54 is drawn toward the electromagnet and the magnetic upper valve body (see FIG. 5A, 509). The valve seat 58 is screwed into the valve plunger 54, so that the valve seat 58 rises off the orifice 53, thus allowing fluid to flow from the valve chamber 52 through the orifice 53, and out the conduit 66, when the electromagnet 303 is energized. A valve spring 56 returns the valve seat 53 to the orifice 58 when the electromagnet 303 is de-energized.

FIG. 4A is a simplified exploded view of a portion of the valve assembly. The valve seat 58 has a threaded portion 401 that is inserted through a center hole 403 of the flat valve spring 56 and screwed into a threaded hole 405 in the valve plunger 54. The flat spring has spiral, or otherwise shaped, relief cut-outs 407 that allow the spring to travel toward and from the orifice, and that also allow gas to flow through the spring. The flat valve spring 56 also supports the valve plunger 54 within the upper valve block 509. The valve seat 58 optionally includes a seal portion 409, made of a compliant material, such as synthetic rubber or plastic, that seals against the orifice 53 in the orifice body 60 as a result of the force applied by the valve spring 56. In some embodiments, it is desireable to have a metal-to-metal seal wherein a metal valve seat seals against a metal orifice. Thus, the valve spring not only supplies the spring force to seal the valve when the valve is not actuated, but also provides mechanical support for the valve plunger, allowing the hemispherical valve plunger to travel within a mating hemispherical cavity in the valve block without further support of the valve plunger. The orifice body 60 has inlets 411A, 411B that are connected on the bottom of the orifice body by an inlet ring (not shown). Of course, an orifice body with a single inlet, or more than two inlets, could be configured to operate with the present invention.

FIG. 4B shows the bottom 413 of the orifice body 60. The inlet ring 415 is a chamber that couples the inlets together. An annular ridge 417, in conjunction with an O-ring (not shown) isolates the inlets from the outlet 61, which is coupled to the orifice 53, when the orifice body is installed in the valve assembly.

Figure 5A:
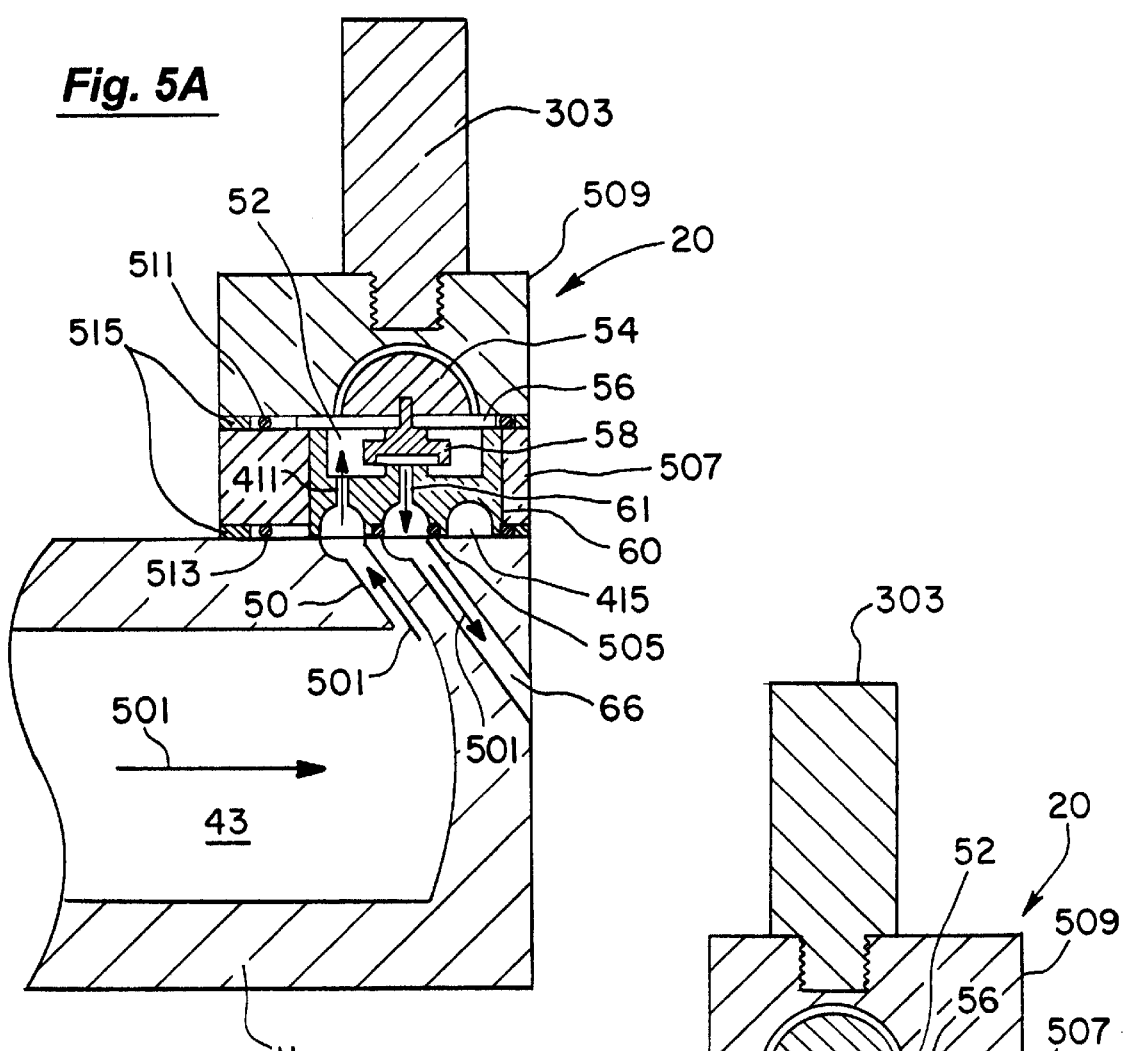
FIG. 5A is a simplified cross section of a portion of an MFC with an asymmetric valve block configured for an upstream application.
Figure 5B:
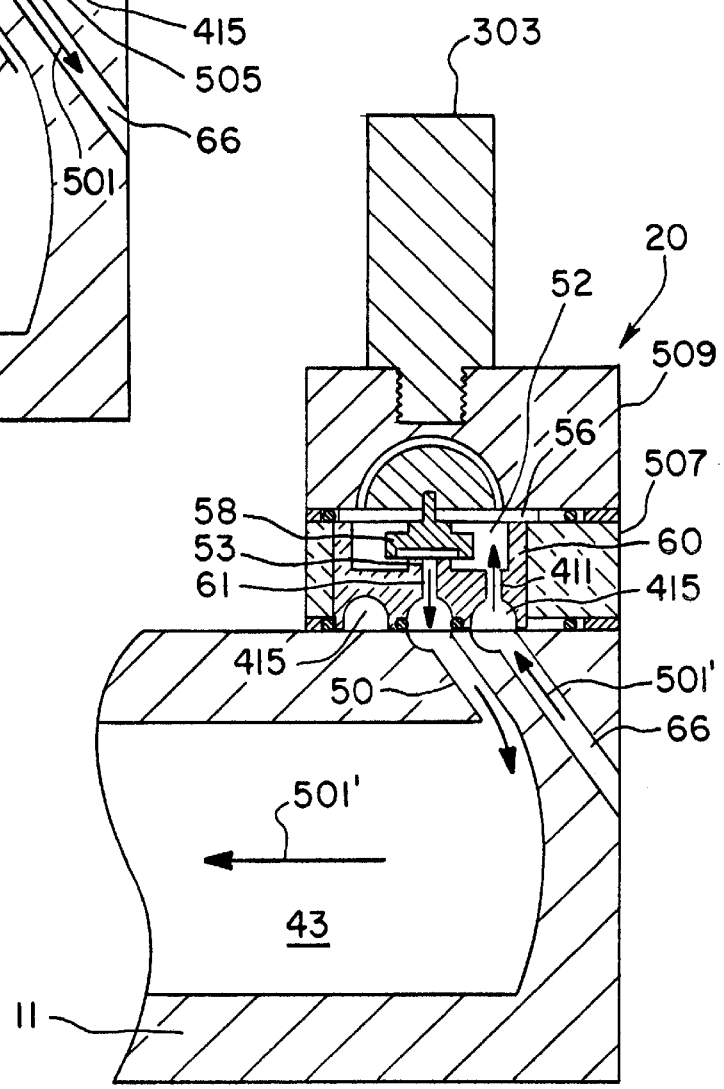
FIG. 5B is a simplified cross section of a portion of an MFC with the asymmetric valve block of FIG. 5A re-configured for a downstream application.

FIGS. 5A and 5B illustrate one embodiment of how the valve assembly of the MFC can be configured for either upstream and downstream flows. The flow in each case is from valve cavity 52 through the orifice 53. If the flow is in the opposite direction, the pressure lifts the valve seat 58 off the orifice 53, thus leaking fluid through the valve. This prevents a conventional MFC from simply being rotated 180 degrees in its application configuration, making the former MFC inlet the outlet, and vice versa. In both configurations shown in FIG. 5A and 5B, the direction of flow does not lift the valve seat off the orifice, and thus the present design allows either configuration by virtue of a novel valve assembly design.

FIG. 5A shows the MFC in an upstream configuration. Fluid flowing in the direction of arrows 501 flows through the main cavity 43, enters the valve-by-pass conduit 50, and then into the inlet ring 415. It is understood that the inlet ring is not necessary, as the fluid could enter the inlet directly, as shown, and that the inlet ring can provide a conduit to additional inlets, or to an inlet not located directly above the valve-by-pass conduit. From the inlet ring 415, the fluid flows through an inlet or inlets 411 (only one of which is shown) into the valve chamber 52. The fluid pressure in the valve chamber works in concert with the valve spring 56 to hold the valve seat 58 against the orifice 53, which is coupled to the outlet 61 from the valve chamber 52. From the orifice 53, the fluid flows into the inlet/outlet conduit 66, which in this configuration acts as an output. An O-ring 505 seals the outlet 61 from the inlet ring 415.

FIG. 5B shows the MFC of FIG. 5A in a downstream configuration. To obtain this configuration, the valve assembly 20 was rotated 180 degrees with respect to the main body 11. Rotating the valve assembly 20 in this fashion aligns the orifice body 60 such that the inlet 411 of the orifice communicates with the inlet/outlet conduit 66, which in this configuration acts as an inlet. The orifice 53 now also communicates with the valve-by-pass conduit 50. Fluid flowing in the direction of arrows 501' flows in the inlet/outlet conduit 66 and into the inlet ring 413. The fluid then flows through the inlet 411 or inlets (only one of which is shown), and into the valve chamber 52. The fluid in the valve chamber works in concert with the valve spring 56 to hold the valve seat 58 against the orifice 53, which is the outlet from the valve chamber 52. From the orifice 53, the fluid flows into the outlet 61 to the valve-by-pass conduit 50 and into the main cavity 43.

The valve block 507 and the upper valve block 509 are connected to the main body 11 with screws or bolts (not shown). In this embodiment, the upper valve block 509 is made of a magnetic material, such as 440 stainless steel, and the valve block 507 is made of a non-magnetic material, such as 316 stainless steel. Providing a non-magnetic valve block reduces the magnetic load on the coil 303. An O-ring 511 seals the upper valve block with the valve block, and another O-ring 513 seals the valve block 509 with the main body 11. Spacers 515 limit the amount of compression of the O-rings 511, 513 that occurs when the upper valve block 509 and valve block 507 are attached to the main body 11. In an alternative embodiment, a combination valve block (not shown) was fabricated out of a single piece of 440 stainless steel, combining the valve block with the upper valve block, thus eliminating the need for the spacers and O-rings discussed above. The combination valve block was found to operate acceptably with a particular coil.

The holes in the upper valve block and the valve block are formed in a pattern that allows the valve assembly 20 to be rotated 180 degrees with respect to the main body 11 and attached to the main body using the same screws. Thus, no additional parts are needed to convert the MFC from an upstream configuration to a downstream configuration. However, other operations may be necessary to complete the re-configuration. For example, the sensor assembly may need to be rotated 180 degrees with respect to the main body, and the harness wires from the sensor assembly to the control unit may need to be similarly reconfigured. The wire harness from the sensor assembly to the control unit may have a reversible plug to allow convenient reversing of the harness wiring. Furthermore, the MFC may have to be recalibrated for the appropriate application after reconfiguration.

It is understood that the valve assembly 20 could be slid laterally with respect to the inlet/outlet conduit 66 and the valve-by-pass conduit 50 from a configuration similar to the one shown in FIG. 5A to a configuration similar to the one shown in FIG. 5B by providing the appropriate mounting holes in the main body. The inlet ring 413 would convey the gas from the appropriate conduit to the inlet 411 of the orifice body 60.

Figure 5C:
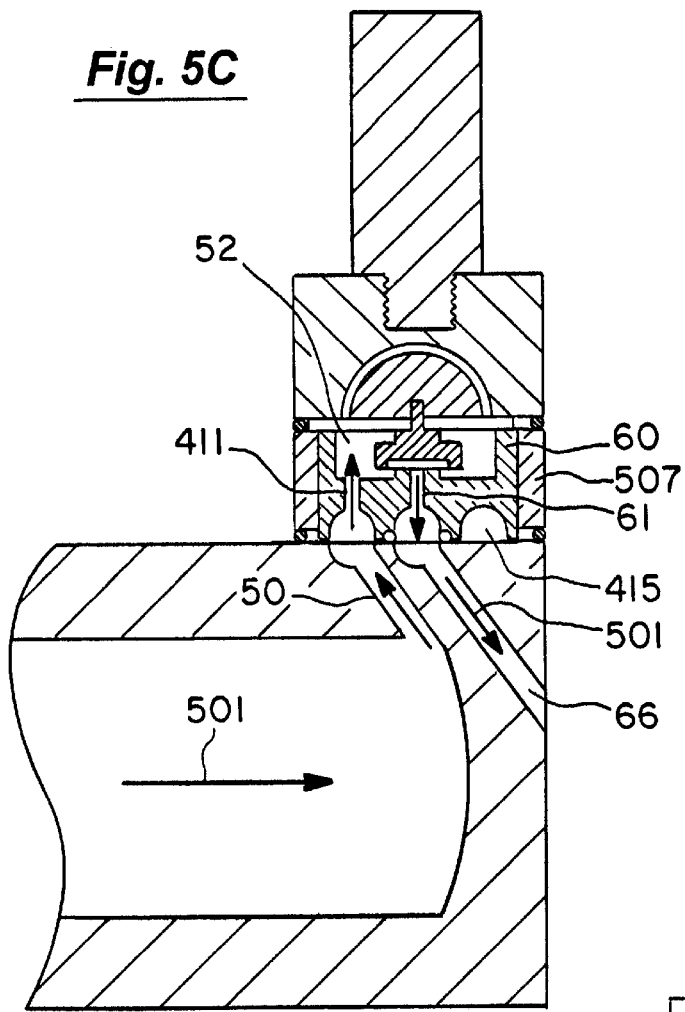
FIG. 5C is a simplified cross section of a portion of an MFC with a symmetric valve block configured for an upstream application.

FIG. 5C is a simplified cross section of a portion of an MFC with a symmetric valve block configured for an upstream application. The inlet 411 of the orifice body 60 in the lower valve block 507 is positioned over the valve-by-pass conduit 50, and the outlet 61 from the orifice 63 is positioned over the inlet/outlet conduit 66. Fluid flows in the direction shown by the arrows 501.

Figure 5D:
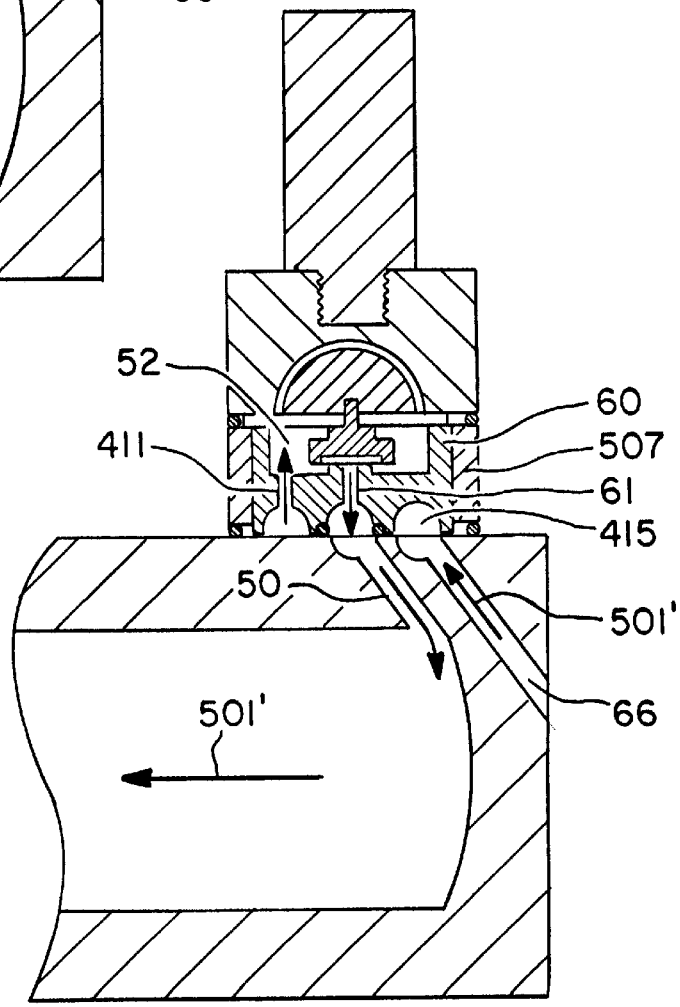
FIG. 5D is a simplified cross section of a portion of an MFC with the symmetric valve block of FIG. 5C re-configured for a downstream application.

FIG. 5D is a simplified cross section of a portion of an MFC with the symmetric valve block of FIG. 5C re-configured for a downstream application. In this configuration, the valve assembly has been slid with respect to the main body to position the inlet ring 415 of the orifice body 60 in the lower valve block 507 over the inlet/outlet conduit 66, and to position the outlet 61 from the orifice 63 over the valve-by-pass conduit 50. Fluid flows through the inlet ring to the inlet 411, where it enters the valve chamber 52, as shown by the arrows 501'. In an alternative embodiment, a single inlet could be provided without an inlet ring, and the orifice body rotated within the valve block to align the inlet and outlet over the appropriate conduits as the valve block is reconfigured to the main body.

Whether the valve assembly 20 is rotated or slid to align the orifice body 60 with either the valve-by-pass conduit or the inlet/outlet conduit, alternative configurations of the orifice body are possible. FIG. 5E illustrates an orifice body 560 without an inlet ring and with two inlets. Inlet 510 is the active inlet, while inlet 512 is the inactive inlet. This configuration is appropriate for a flow from the valve-by-pass conduit 50 out the inlet/outlet conduit 66, as indicated by the arrows. The valve body 507 may be rotated or slid with respect to the main body 11 to align the orifice body 560 as shown in FIG. 5F. Now, inlet 512 is the active inlet and inlet 510 is inactive. This configuration is appropriate for a flow from the inlet/outlet conduit 66 out the valve-by-pass conduit 50, as indicated by the arrows.

Figure 5G:
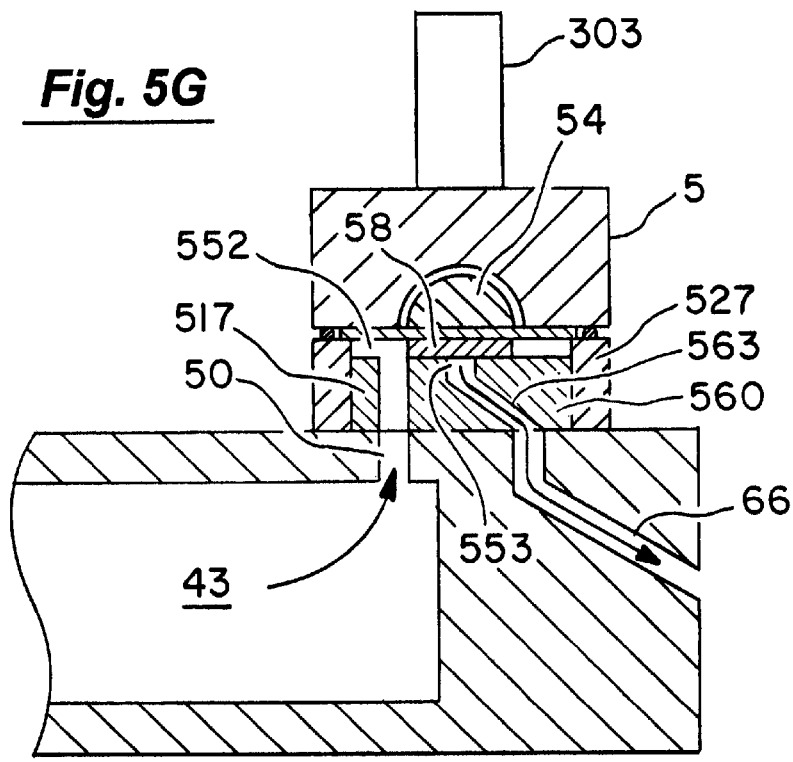
FIG. 5G is a simplified cross section of a portion of an MFC with an orifice body with an offset outlet configured for an upstream application.
Figure 5H:
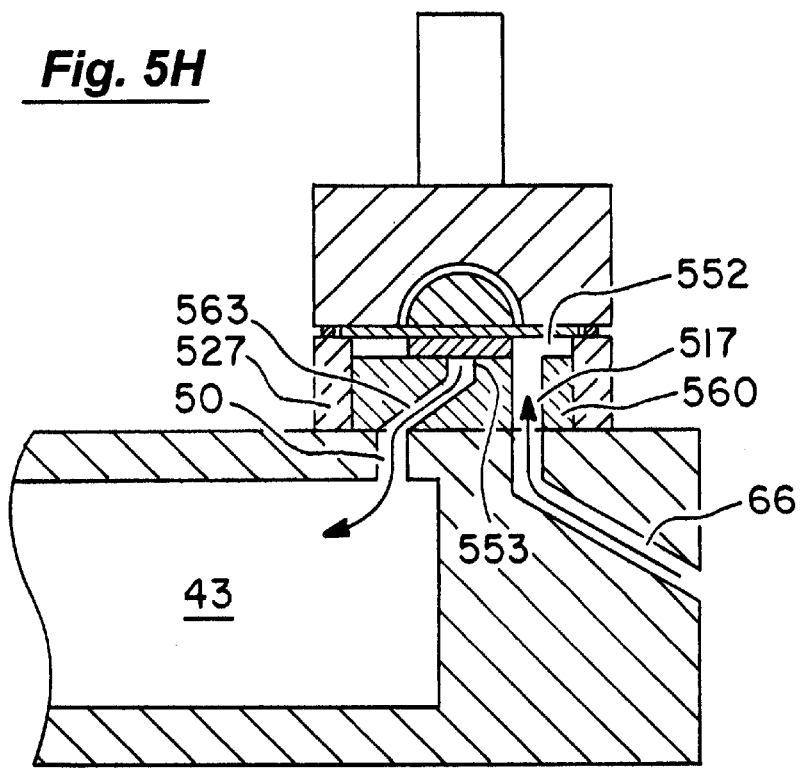
FIG. 5H is a simplified cross section of a portion of an MFC with the orifice body of FIG. 5E re-configured for a downstream application.

FIGS. 5G and 5H illustrate an alternative embodiment of the present invention in which the valve body 5 does not need to be rotated or slid in relation to the main body 11. In this embodiment, the orifice body 560 has an offset output channel 561. That is, the output channel 561 is not co-axial with the centerline of the valve plunger 54 or valve seat 58 motion. In the configuration shown in FIG. 5G, the offset output channel 563 connects the orifice 553 with the inlet/outlet conduit 50, and an inlet 517 in the orifice body 560 connects the valve chamber 552 with the valve-by-pass conduit 50. The portions of the conduits that communicate with the orifice channel and the inlet in the orifice body are symmetrically offset from the centerline so that the valve may be reconfigured from a downstream configuration to an upstream configuration by removing the valve body 5 from the main body 11, rotating the orifice body 560 within the valve body to the desired position, and reattaching the valve body to the main body.

FIG. 5H shows the portion of an MFC represented in FIG. 5G in an alternative flow configuration. In this case, the output channel 561 connects the orifice 553 with the valve-by-pass conduit 50, and the inlet 517 connects the inlet/outlet conduit 66 with the valve chamber 552.

FIGS. 5A through 5H show that many embodiments of the present invention are possible. Each embodiment allows an MFC valve assembly to be simply and easily converted from an upstream configuration to a downstream configuration. In each of the illustrated embodiments, the conversion from an upstream configuration to a downstream configuration is accomplished without additional spare parts; however, some embodiments may exchange or add parts during a conversion.

2. MFC Conversion Techniques

The present method provides, for example, a relatively simple technique for converting an MFC valve assembly from an upstream configuration to a downstream configuration using a single valve assembly. A method for fabricating a mass flow controller according to the present invention can be briefly described as follows:

(1) Provide an MFC with main body and a convertible valve assembly;
(2) Remove the valve assembly from the main body;
(3) Rotate the valve assembly from its initial orientation with respect to the main body;
(4) Reattach the valve assembly to the main body;
(5) Reconfigure the sensor assembly, if necessary, including rotating the sensor tube with respect to the main body and reversing the harness wiring; and
(6) Calibrate MFC to the selected fluid flow range.

The above sequence of steps uses a single valve assembly that can be fitted for either upstream or downstream operation without the need for additional or alternate parts. The single valve assembly unit can provide, for example, ease in manufacturing since only a single valve assembly unit is used in preferred embodiments. Details of these steps are provided by reference to FIG. 6A, below.

Figure 6A:
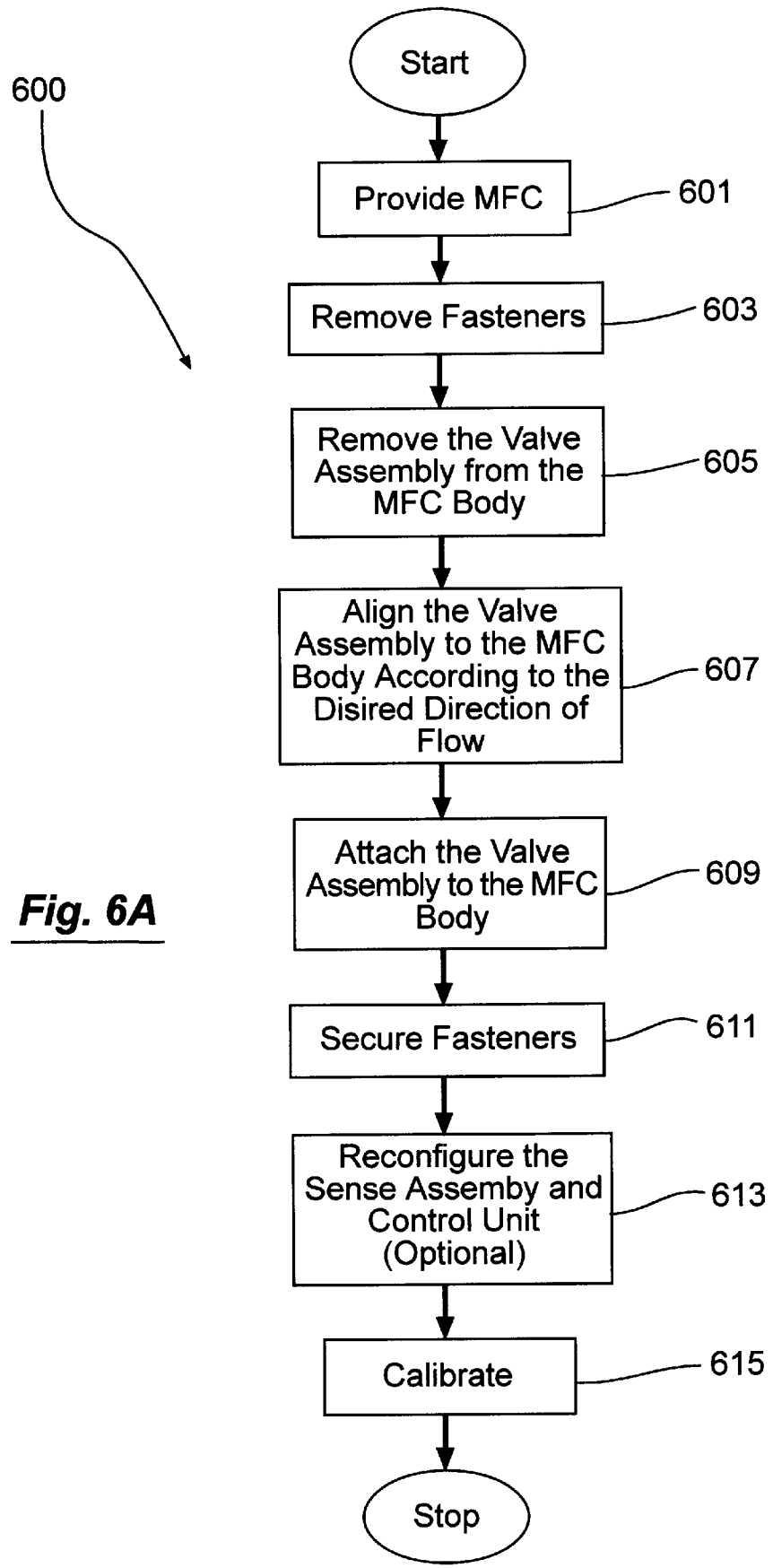
FIG. 6A is a simplified flow chart of a process for converting an MFC from one configuration to another by re-aligning the valve body to the main body of the MFC.

FIG. 6A is a simplified flow diagram 600 of a method of converting a valve assembly from one configuration to another according to the present invention. This diagram is merely an illustration and should not limit the scope of the claims herein. The method begins by providing an MFC (step 601). The MFC can be similar to the one described above, but is not limited to such an MFC. This MFC can be a used MFC, which has been removed from, for example, a wafer fabrication line. Alternatively, the MFC can be a stocked MFC, which is one of many and has no immediate usefulness in, for example, the fabrication line. The MFC, however, is not limited to these, but can be others.

The method includes a step of removing a valve assembly having a first fluid flow direction configuration from the MFC. In particular, a step of disassembling fasteners (step 603) that secure a valve body to the MFC is performed. The valve body is generally similar to the ones described in connection with FIGS. 5A and 5B, above, but can be others. The valve assembly has novel features, such as a reversible valve body that allows the operator to configure the valve assembly for different directions of flow and the like. After removing the fasteners holding the valve body to the main body from the housing, the valve body is removed from the MFC (step 605) and aligned to the MFC body (step 607) according to the desired direction of flow. As discussed above, one embodiment of a valve body may be rotated and another embodiment may be slid in order to align the valve body with the MFC body. The valve body is then attached to the MFC body (step 609) and is secured with fasteners (step 611). If necessary or appropriate, other components of the MFC, such as the sensor assembly or the control unit, may be reconfigured (step 613). Of course, the desired electrical modifications will often depend upon the applications. The MFC is then calibrated (step 615) for the intended application (i.e. type of fluid or gas and flow rate).

Figure 6B:
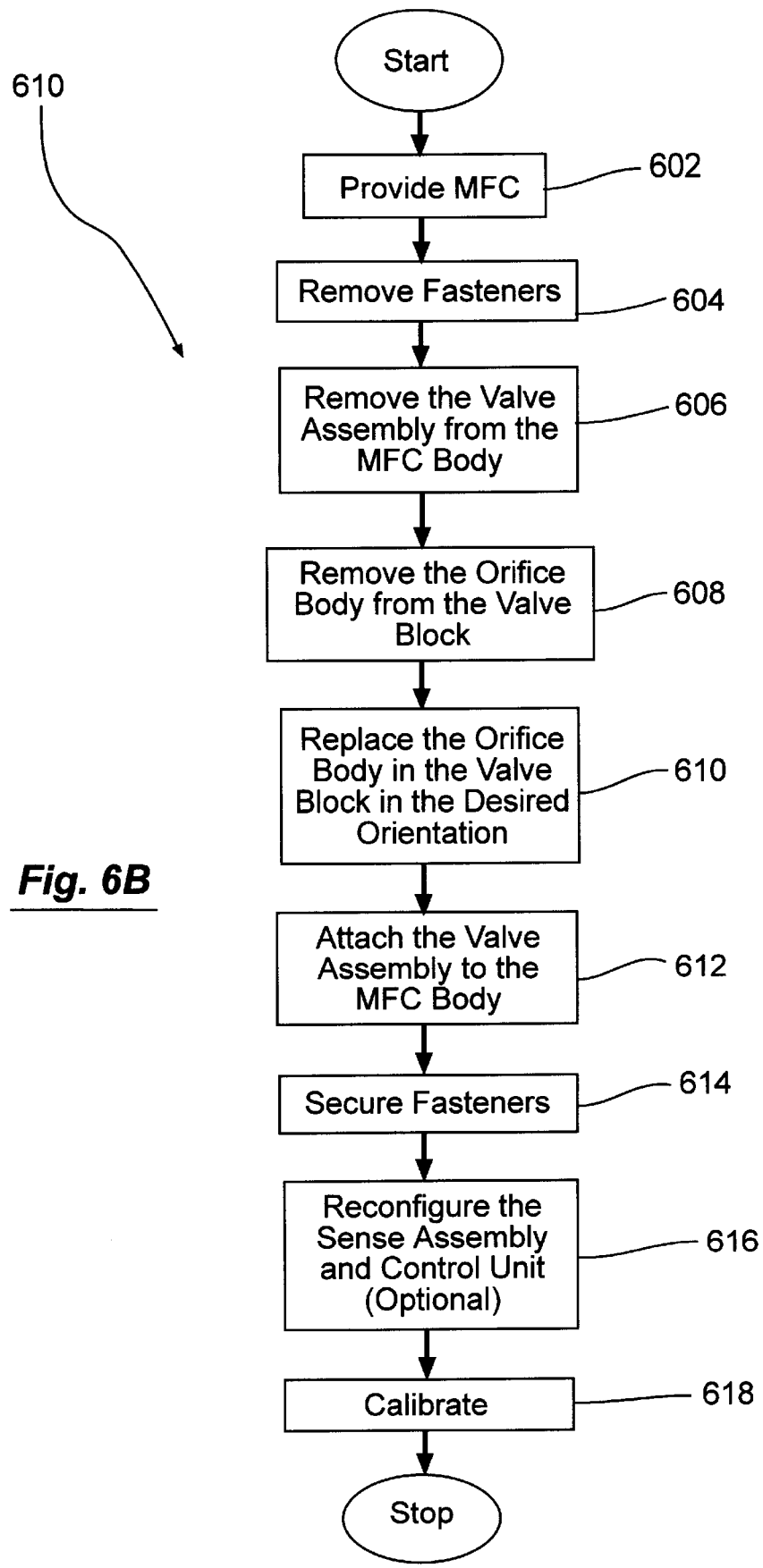
FIG. 6B is a simplified flow chart of a process for converting an MFC from one configuration to another by realigning an orifice body within the valve body.

FIG. 6B is a simplified flow diagram 610 of another method of converting a valve assembly from one configuration to another according to the present invention. This diagram is merely an illustration and should not limit the scope of the claims herein. The method begins by providing an MFC (step 602). The MFC can be similar to the one described above, but is not limited to such an MFC. This MFC can be a used MFC, which has been removed from, for example, a wafer fabrication line. Alternatively, the MFC can be a stocked MFC, which is one of many and has no immediate usefulness in, for example, the fabrication line. The MFC, however, is not limited to these, but can be others.

The method includes a step of removing a valve assembly having an orifice with an offset outlet, which defines a first fluid flow direction configuration, from the MFC. In particular, a step of disassembling fasteners (step 604) that secure a valve body to the MFC is performed. The valve body is generally similar to the one described above in connection with FIGS. 5G and 5H, above, but can be others. The valve assembly has novel features, such as a reversible orifice body that allows the operator to configure the valve assembly for different directions of flow and the like. After removing the fasteners holding the valve body to the main body from the housing, the valve body is removed from the MFC (step 606) and the orifice body is removed from the valve body (step 608) according to the desired direction of flow. The orifice body may be rotated, as discussed above in connection with FIGS. 5C and 5D, or, in alternative embodiments, may be flipped, in order to align the orifice body with the MFC body in the desired configuration, and is replaced in the valve body (step 610). The valve body is then attached to the MFC body (step 612) and is secured with fasteners (step 614). If necessary or appropriate, other components of the MFC, such as the sensor assembly or the control unit, may be reconfigured (step 616). Of course, the desired electrical modifications will often depend upon the applications. The MFC is then calibrated (step 618) for the intended application (i.e., the type of fluid or gas and flow rate).

Although the above descriptions with regard to modifying the MFC are in terms of a specific sequence of steps, these steps can be altered, separated, or even combined. Furthermore, modification of the MFC can occur, for example, at the vendor site or in-house, since it is relatively simple to perform. Modification of present MFCs allows, for example, a single MFC housing to be used in a variety of fluid flow applications, which are not available with pre-existing techniques. Accordingly, the present MFC provides greater flexibility and use over a wider range of applications.

Figure 6C:
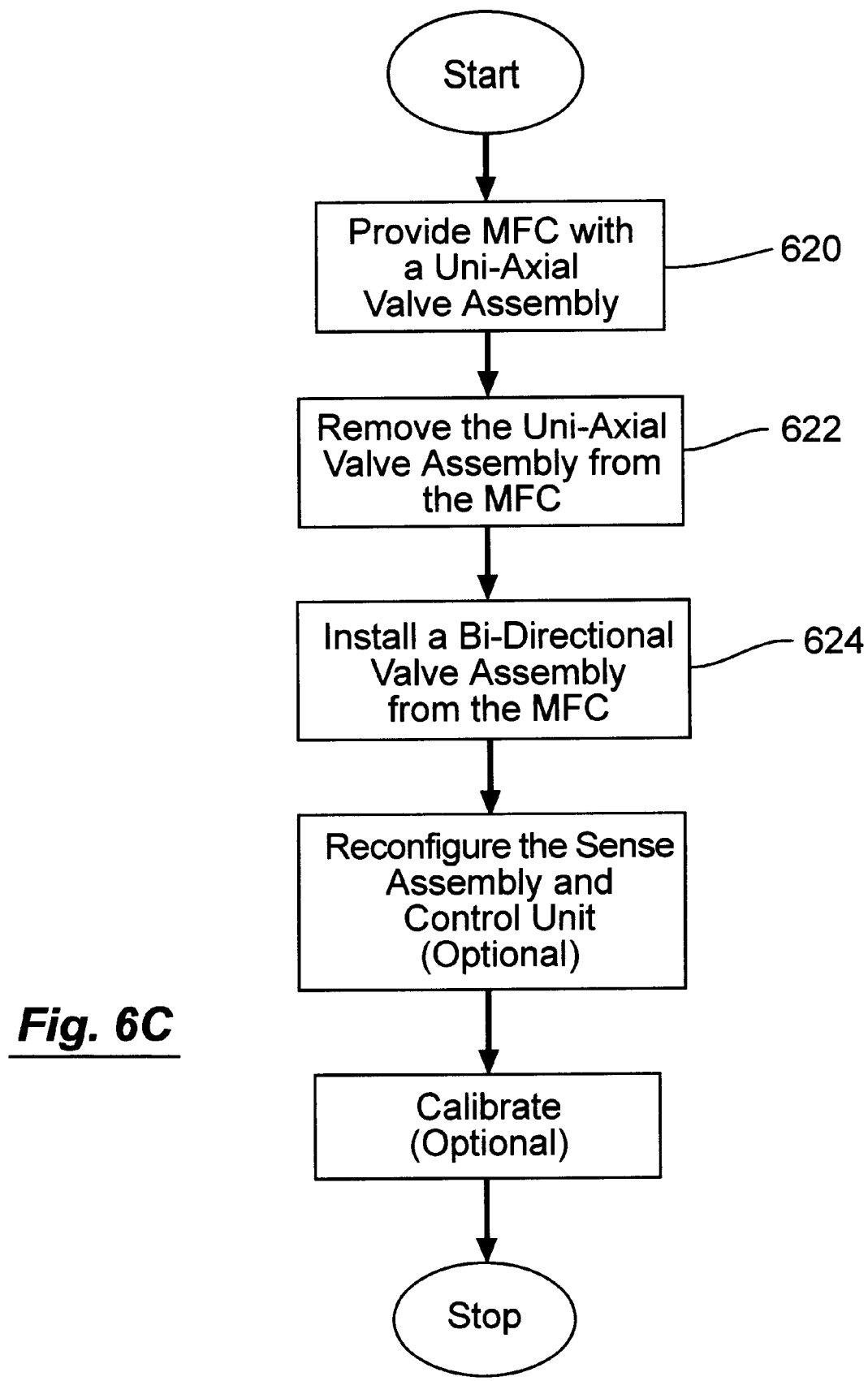
FIG. 6C is a simplified flow chart of a process for converting a conventional MFC into an MFC according to an embodiment of the present invention.

FIG. 6C is a simplified flow diagram of a method of converting a conventional MFC to an MFC according to an embodiment of the present invention. The conventional MFC is an MFC with a unidirectional valve assembly, that is, a valve assembly that operates in an upstream or in a downstream configuration, but cannot be converted from one configuration to the other. This diagram is merely an illustration and should not limit the scope of the claims herein. The method begins by providing a conventional MFC (step 620). This MFC can be an MFC that is installed in a wafer fabrication line, for example. Alternatively, the MFC can be a stocked MFC, which is one of many and has no immediate usefulness in, for example, the fabrication line. The MFC, however, is not limited to these, but can be others.

The method includes a step of removing a conventional valve assembly from the MFC (step 622), and installing a bi-directional valve assembly on the MFC (step 624). A bi-directional valve assembly is a valve assembly that can be converted to operate in a upstream configuration from a downstream configuration, and vice versa, without removing or adding parts to the valve assembly.

While the above is a full description of the specific embodiments, various modifications, alternative constructions and equivalents may be used. For example, while the description above is in terms of using the MFC for semiconductor processing applications, it would be possible to implement the present invention with almost any application, including, for example, the manufacture of flat panel displays, hard disk drives, medical devices, or any other article of manufacture or chemical, which uses controlled fluid flow. Additionally, the invention can be applied to a variety of industries such as medical, petroleum, environmental, chemical, biomedical, materials, or the like. Therefore, the above description and illustrations should not be taken as limiting the scope of the present invention which is defined by the appended claims.

What is claimed is:

1. A fluid valve assembly for use in a mass flow controller, said mass flow controller having a main body having first and second conduits, the valve assembly comprising:
   a valve body defining a valve chamber;
   an orifice body within the valve body, the orifice body defining an inlet coupled to the valve chamber by an inlet conduit, and an orifice having an outlet; and
   a valve seat capable of sealing the orifice from the valve chamber, and capable of moving in relation to the orifice to couple the orifice to the valve chamber;
   wherein the valve body is adapted to be coupled to said main body in at least two flow configurations, wherein a first flow configuration couples the inlet to the first conduit and couples the outlet to the second conduit, and wherein a second flow configuration couples the inlet to the second conduit and couples the outlet to the first conduit.

2. The valve assembly of claim 1 wherein the valve body allows the first flow configuration to be transformed into the second flow configuration by rotating the valve body with respect to the main body of the mass flow controller.

3. The valve assembly of claim 1 wherein the valve body allows the first flow configuration to be transformed into the second flow configuration by sliding the valve body with respect to the main body of the mass flow controller.

4. The valve assembly of claim 1 further comprising a hemispherical magnetic valve plunger coupled to the valve seat.

5. The valve assembly of claim 4 wherein the hemispherical magnetic valve plunger comprises 440 stainless steel.

6. The valve assembly of claim 1 wherein the orifice body further comprises an inlet ring.

7. The valve assembly of claim 6 wherein the inlet ring couples said first conduit or said second conduit of the main body of the mass flow controller to at least the inlet.

8. The valve assembly of claim 6 wherein the inlet ring is coupled to a plurality of inlets in the orifice body.

9. The valve assembly of claim 1 wherein the orifice body has an active inlet and an inactive inlet.

10. An orifice body for use in a control valve assembly of a mass flow controller, the orifice body comprising:
    an inlet with an inlet port;
    an orifice; and
    an offset output channel, having an outlet port;
    wherein the orifice body is adapted to be aligned to a first conduit and a second conduit of a main body of a mass flow controller to couple the inlet port to the first conduit and the outlet port to the second conduit, and wherein the orifice body is adapted to be realigned within the valve assembly to couple the inlet port to the second conduit and to couple the outlet port to the first conduit.

11. The orifice body of claim 10 wherein the orifice body is essentially circular, allowing rotation within the valve body, and the orifice is essentially in the center of the orifice body, and wherein the inlet port and the outlet port are essentially radially equidistant from the orifice.

12. A method of converting a control valve assembly of a mass flow controller from a first flow configuration to a second flow configuration, the method comprising:
    (a) providing a mass flow controller with the first flow configuration;
    (b) removing the control valve assembly from a main body of the mass flow controller;
    (c) rotating the control valve assembly with respect to the main body; and (d) joining the control valve assembly to the main body of the flow controller to result in the second flow configuration.

13. The method of claim 12 further comprising the step of calibrating the mass flow controller for a flow rate in the second flow configuration.

14. A method of converting a control valve assembly of a mass flow controller from a first flow configuration to a second flow configuration, the method comprising:

(a) providing a mass flow controller with the first flow configuration;

(b) removing the control valve assembly from a main body of the mass flow controller;

(c) sliding the control valve assembly with respect to the main body; and (d) joining the control valve assembly to the main body of the flow controller to result in the second flow configuration.

15. The method of claim 14 further comprising the step of calibrating the mass flow controller for a flow rate in the second flow configuration.

16. A method of converting a control valve assembly of a mass flow controller from a first flow configuration to a second flow configuration, the method comprising:

(a) providing a mass flow controller with the first flow configuration;

(b) removing the control valve assembly from a main body of the mass flow controller;

(c) rotating an orifice body with respect to the control valve assembly; and (d) joining the control valve assembly to the main body of the flow controller to result in the second flow configuration.

17. The method of claim 16 further comprising the step of calibrating the mass flow controller for a flow rate in the second flow configuration.

18. A method for converting a mass flow controller, the method comprising:

(a) providing a mass flow controller with a uni-directionally mounted valve assembly;

(b) removing the uni-directionally mounted valve assembly from the mass flow controller; and (c) installing a bi-directionally mounted valve assembly on the mass flow controller.

19. A mass flow controller, comprising a main body having first and second conduits;

a sensor unit fluidly coupled to said main body; and a control valve assembly fluidly coupled to said main body, said control valve assembly comprising, a valve body defining a valve chamber;

an orifice body within the valve body, the orifice body defining an inlet coupled to the valve chamber by an inlet conduit, and an orifice having an outlet; and a valve seat capable of sealing the orifice from the valve chamber, and capable of moving in relation to the orifice to couple the orifice to the valve chamber;

wherein the valve body is coupled to said main body in a first flow configuration having the inlet coupled to the first conduit and the outlet coupled to the second conduit, and wherein the valve body is adapted to be coupled to the main body in a second flow configuration having the inlet coupled to the second conduit and the outlet coupled to the first conduit.

* * * * *